United States Patent
Zoldi et al.

(10) Patent No.: US 10,115,153 B2
(45) Date of Patent: Oct. 30, 2018

(54) DETECTION OF COMPROMISE OF MERCHANTS, ATMS, AND NETWORKS

(75) Inventors: Scott Zoldi, San Diego, CA (US); Michael Urban, Annandale, VA (US)

(73) Assignee: Fair Isaac Corporation, Roseville, MN (US)

( * ) Notice: Subject to any disclaimer, the term of this patent is extended or adjusted under 35 U.S.C. 154(b) by 389 days.

(21) Appl. No.: 12/347,559

(22) Filed: Dec. 31, 2008

(65) Prior Publication Data
US 2010/0169192 A1    Jul. 1, 2010

(51) Int. Cl.
*G06Q 40/00* (2012.01)
*G06Q 20/40* (2012.01)

(52) U.S. Cl.
CPC ......... *G06Q 40/00* (2013.01); *G06Q 20/4016* (2013.01); *G06Q 40/12* (2013.12)

(58) Field of Classification Search
CPC ..................................................... G06Q 40/00
USPC ..................................... 455/410; 705/39, 30
See application file for complete search history.

(56) References Cited

U.S. PATENT DOCUMENTS

| | | | |
|---|---|---|---|
| 6,535,728 B1 * | 3/2003 | Perfit et al. | 455/410 |
| 2004/0199462 A1 * | 10/2004 | Starrs | 705/39 |
| 2006/0080230 A1 * | 4/2006 | Freiberg | 705/39 |
| 2009/0192855 A1 * | 7/2009 | Subramanian | G06Q 10/04 705/35 |

* cited by examiner

*Primary Examiner* — Russell S Glass
(74) *Attorney, Agent, or Firm* — Mintz, Levin, Cohn, Ferris, Glovsky and Popeo, P.C.

(57) ABSTRACT

A system and method for detecting compromise of financial transaction instruments associated with a merchant or automated teller machine (ATM) are disclosed. Historical data representing a historical aggregate financial transaction instrument behavior history is stored in a computer memory. The historical data is received at the computer from one or more merchants and ATMs via a communications network. Authorization data representing authorization behavior of a plurality of financial transaction cards related to corresponding financial transactions at the same or a different one or more merchants and ATMs is received by the computer. Abnormal activity data representing an abnormal aggregate financial transaction instrument activity based on the authorization data is determined, and the historical data is compared with the abnormal activity data to generate a compromise profile for the plurality of financial transaction instruments.

7 Claims, 9 Drawing Sheets

DETECTION OF COMPROMISE OF MERCHANTS, ATMS, AND NETWORKS

BACKGROUND

Modern economies increasingly depend on a variety of devices that facilitate financial transactions, or the exchange of legal tender for goods or services or funds transfers. Prominent among these devices are credit cards, debit cards, and automated teller machines (ATMs), online banking, mobile banking and money transfer products which use such devices. These devices include numerical information such as an account number representing a user's credit, debit, prepaid or banking account, as well as textual information that may indicate, as an example, the identity of the user, the identity of the creditor or banker entity. Also included may be security code values or information used to reduce fraud. These values may also include forms of multi factor identification that a consumer or business uses to verify identity with the entity enabling the transaction, including but not limited to images, computer characteristics, user biological characteristics, IP addresses and computed values.

A problem with the above financial transaction devices is that their numerical and/or textual information may be compromised, that is, obtained by an unauthorized third party (i.e. fraudsters). Once the information is compromised, the third party may execute a number of unauthorized and highly damaging financial transactions, and often go undetected for a long period of time.

Mass compromise of account and identity information is a major fraud concern for financial institutions, processors, networks and merchants. Past methodologies of compromise detection have included taking collections of fraud account information to determine common links in the past transaction histories associated with the fraud accounts. However, detection of compromises that do not have easy-to-identify commonalities between account transactions, for example when a transaction network or data processing network is breached, or when access to information will not be part of the transaction stream used by the compromise detection system (for example debit cards and personal identification numbers, or "PINs," compromised at a fake ATM, which is not on a transaction network), have not been adequately addressed. In these situations, other approaches are necessary to detect groupings of compromised accounts based on suspicious usage patterns.

Other types of compromises are much more difficult to detect. Network breaches may not be directly traced to a single ATM or merchant. In this situation, payment processors may be compromised, and subsequently, account and identity information is stolen in such a fashion that the accounts that are compromised may not have a natural common characteristic, such as same receiver/merchant/ATM to tie accounts together in a compromise cluster. Likewise, accounts are sometimes used as forms of identification, for example to retrieve a airline reservation, and their use in this fashion will not result in an authorization or posting that could be used in a system that relies on purchase authorizations/postings to link accounts to a common point of compromise. Further, when fake ATM or other devices or phishing attacks are set up to collect information, they are often not linked to the network, and it is impossible to determine from the accounts' transaction histories what accounts have been to a particular rogue device designed to collect account information. Also account providers prefer not to block and reissue large numbers of accounts every time a breach is identified. Account providers risk consumers turning away from using their payment instruments due to public perceptions of payment system security. Providing the accounts with the highest likelihood of compromise into a real time (or just in time) fraud detection system will allow account providers the flexibility of denying transactions at authorization based on their compromise risk score. This may reduce the need to close the account at all or institute a large block and reissue of accounts to account holders. At times the size of the breach may preclude account providers from performing a block and reissue at all. Particularly when other issuers are impacted similarly and there is not enough industry capacity to reissue all the accounts in a timely manner. The fraud and compromise location and type information can be shared with law enforcement and other entities to catch the perpetrators of the compromises and subsequent fraudulent transactions.

SUMMARY

In general, this document discusses a system and method for point of compromise and mass compromise detection for financial transaction instruments, or "cards," associated with a common point of purchase such as a merchant or ATM.

Compromise associated with a common point of usage can be detected by looking at the pre-fraud statistics associated with the receiver, merchant or ATM over time to look for abnormalities and then to trace through the histories of all the accounts that transacted during that time period of abnormal pre-fraud rate to determine the extent and membership of the compromise. When the pre-fraud rates are up uniformly over a long period, this is more an indication of a mass compromise of account information. This can often happen when account information is being stored by the receiver or merchant and a critical database had been compromised, or data stolen with regard to accounts that transacted at that merchant or with the receiver. Often these types of events are based on non-compliance with rules concerning properly securing account information in an encrypted fashion, either at the terminal itself or in the back end transaction processing system. The focus on receiver/website/merchant/ATM history and account history enables the pre-fraud statistics to be updated with each reported fraud account and the account membership to be determined by looking at accounts that transacted during the high pre-fraud rate period at the receiver/website/merchant/ATM.

Once the compromise is detected, variables at both the account profile and compromise cluster profile are used to produce a compromise account score that prioritizes compromised accounts according to probability of future fraudulent use, based on the individual account behaviors and the behaviors of other accounts in the cluster. Individual account providers can then translate these scores to risk categories for operational implementation. For example an account provider may assign accounts to a low risk, medium risk, and high risk category. Accounts in these categories are then worked at varying thresholds associated with account-level fraud scores (i.e. traditional account fraud scores), to provide early detection of fraud and higher fraud savings than traditional card scores alone. Using risk categories allows account providers to flexibly manage their fraud risk of specific compromises over time.

Abnormal pre-fraud patterns (accounts that make legitimate transactions that will become fraudulent within some time window of the legitimate transaction) can be determined statistically by determining uncharacteristically high pre-fraud rates based on the normal variances at a particular receiver, website, merchant or ATM. These periods of high pre-fraud are then used to identify sets of compromised of accounts that transacted at the receiver, website, merchant or ATM during the high pre-fraud period. In this document, methodologies for detection of points of compromise and mass compromise at receivers, websites, merchants/ATMs are described.

Regardless of the flavor of compromise, once a logical membership of accounts associated with a compromise is determined then an account compromise score is produced for each account based on transactions associated with the account and that of the compromise cluster. This provides an additional dimension of information in fraud detection based on the behavior of the entire cluster of compromised accounts. The compromise account score can then be used along with a traditional fraud account score to enhance referrals associated with those accounts that have additional risk of going fraudulent based on the activity in their associated compromise clusters.

In accordance with one aspect, a computer-implemented method for detecting compromise of financial transaction instruments associated with a merchant device, such as a receiver, a website, a merchant point of sale machine, an automated teller machine (ATM), etc., is presented. The method includes steps, conducted on a computer, of receiving authorization data for each of a number of financial transaction instruments that are authorized for use for a financial transaction with the merchant or ATM. The method further includes, for each of the number of financial transaction instruments, generating a transaction instrument profile that contains predictive fraud variables to be used in conjunction with compromise cluster analytic variables to assign a compromise transaction instrument score if any of the financial transaction instruments are identified as being part of a compromise, and generating a transaction instrument profile that contains a purchase history of the transaction instrument, the transaction instrument transaction profile further containing one or more links between financial transaction instruments that are used at a particular merchant each during a common time period.

The method further includes generating a merchant/ATM profile that contains predictive fraud variables relevant for compromise cluster generation, and generating a merchant/ATM transaction instrument history profile that contains financial transaction instrument volume and velocity statistics at numerous time intervals, and tracking data that tracks the number of transaction instruments that experience fraud at a later date. The method further includes receiving, by the computer, reported fraud data that represents a confirmed fraudulent use of one or more of the number of financial transaction instruments. The computer then generates a compromise profile for the one or more of the number of financial transaction instruments based on a comparison of the reported fraud data with the card profile, card transaction profile, merchant/ATM profile, and merchant/ATM card history profile.

In another aspect, a computer-implemented method for detecting compromise of financial transaction instruments associated with a merchant device is presented. The method includes storing historical data representing a historical aggregate financial transaction instrument behavior history, the historical data being received at the computer from one or more merchants and ATMs via a communications network, and receiving authorization data representing authorization behavior of a plurality of financial transaction cards related to corresponding financial transactions at the same or a different one or more merchants and ATMs. The method further includes determining abnormal activity data representing an abnormal aggregate financial transaction instrument activity based on the authorization data, and comparing the historical data with the abnormal activity data to generate a compromise profile for the plurality of financial transaction instruments.

The details of one or more implementations are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a Compromise Analytics system: an analytic architecture to detect compromises, assess their extent, identify the associated compromised financial transaction instruments, (i.e. payment cards or payment accounts, such as online billpay accounts or account-to-account payments via a DDA account protected via security code or password, hereinafter referred to as "cards"), and provide a card compromise score to rank the relative risk of compromised cards. The Compromise Analytics system is associated with a mass compromise/point of compromise analytic detection and compromised card portfolio management system, described in U.S. patent application Ser. No. 11/475,722, filed Jun. 26, 2006, the contents of which are incorporated by reference herein for all purposes.

Compromises associated with common points of purchase and mass compromise are associated with account-information captured at specific receivers/websites/merchants/ATMs and are detected by fluctuations in pre-fraud rate. Compromises associated with 'suspect account lists' are compromises with no detectable commonalities to link accounts. The compromises based on 'suspect account lists' are determined based on the testing behaviors associated with a group of accounts at a receiver, website, merchant or ATM acquiring device.

The Compromise Analytics system is designed to take in the account authorization data and confirmed fraud account information, and output on a periodic basis lists of compromise accounts along with a compromise account score (CAS) and reason codes (RCs) to identify the reasons for suspicion of compromise. The system detects suspected compromised receivers, websites, merchants or ATMs, determines the extent of the compromise, and provides a list of compromised accounts as prioritized by the CAS. This is accomplished through various levels of profiles, as explained in more detail below. The Compromise Analytics as described herein provide specialized reactive analytics on compromise clusters associated with 'suspect account lists,' as these compromised clusters and associated accounts are already behaving in a suspicious fashion, and analytics performed on them need to be reactive and fast, compared to other compromise clusters where fraud plays out more slowly or not at all for a substantial fraction of accounts in some of a large compromise.

Figure 1:
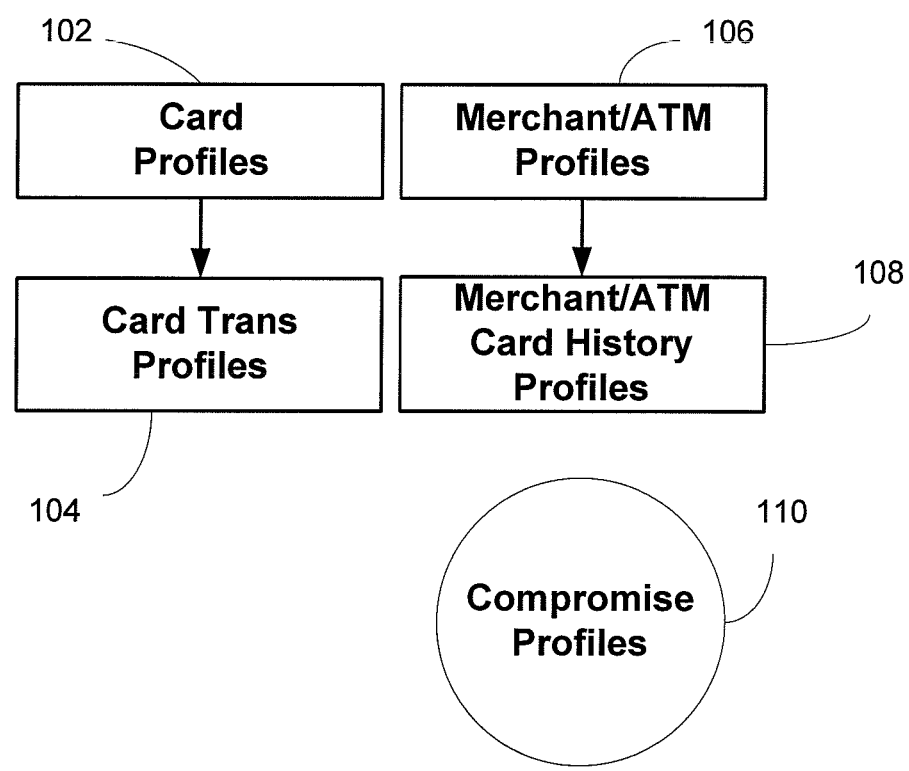
FIG. 1 schematically illustrates various types of profiles for receiver, website, merchant or ATM compromise detection.

In an exemplary implementation, a Compromise Analytics system uses five types of profiles for receiver, website, merchant or ATM compromise detection, as schematically shown in FIG. 1. Account information is contained in two types of account profiles: account profiles 102 and account transaction profiles 104. Each account profile 102 contains predictive fraud variables to be used in conjunction with compromise cluster analytic variables to assign a compromise account score if/when the account is identified as being part of a compromise. Each account transaction profile 104 is used to store a purchase history of the account and is used to provide a link between accounts that visit a particular receiver, website, merchant or ATM each day.

Two types of receiver/website/merchant/ATM profiles include receiver/website/merchant/ATM profiles 106 and receiver/website/merchant/ATM account history profiles 108. Each receiver/website/merchant/ATM profile 106 contains predictive fraud variables relevant for compromise cluster generation. Each receiver/website/merchant/ATM account history profile 108 contains account volume and velocity statistics at numerous time intervals and tracks the number of accounts that experience fraud at a later date. For each time period, a pointer identifies the last account transaction during the time period, which facilitates determining the membership of the compromise cluster through a linked list in the account transaction profiles 104. Receiver/website/merchant/ATM pre-fraud statistics are used to determine deviations from the normal pre-fraud pattern, which points to a potential compromise. Compromise cluster profiles 110 are created based on a score that reflects abnormality in the pre-fraud patterns and velocity associated with the receiver/website/merchant/ATM.

Account compromises associated with ATMs and merchants can take on two different forms. One is a common Point of Compromise (POC); this is where the pre-fraud pattern associated with the receiver/website/merchant/ATM is compared to the normal variations in the pre-fraud pattern to determine abnormality in the pre-fraud pattern. In viewing the pre-fraud statistics associated with a particular merchant/ATM, normal variance in the pre-fraud rate is expected, and areas of suspected compromise can be easily identified by comparing the time intervals of high pre-fraud rate to the typical standard deviations of the pre-fraud for that particular receiver/website/merchant/ATM. A second type of compromise is Mass Compromise (MC); these are typically associated with information stored improperly, and can result in a huge breach of account and identity information. In this situation, there is typically a gradual increase and daily growth in the pre-fraud statistics associated with the merchant device (receiver/website/merchant/processor/ATM, etc.) over a particular long historical time period compared to recent activity. This 'step-function shape' is a tell-tale sign of MC, two distinct areas of accelerated pre-fraud rate vs. lower pre-fraud rate can be identified that can not be explained by normal variances.

Figure 2:
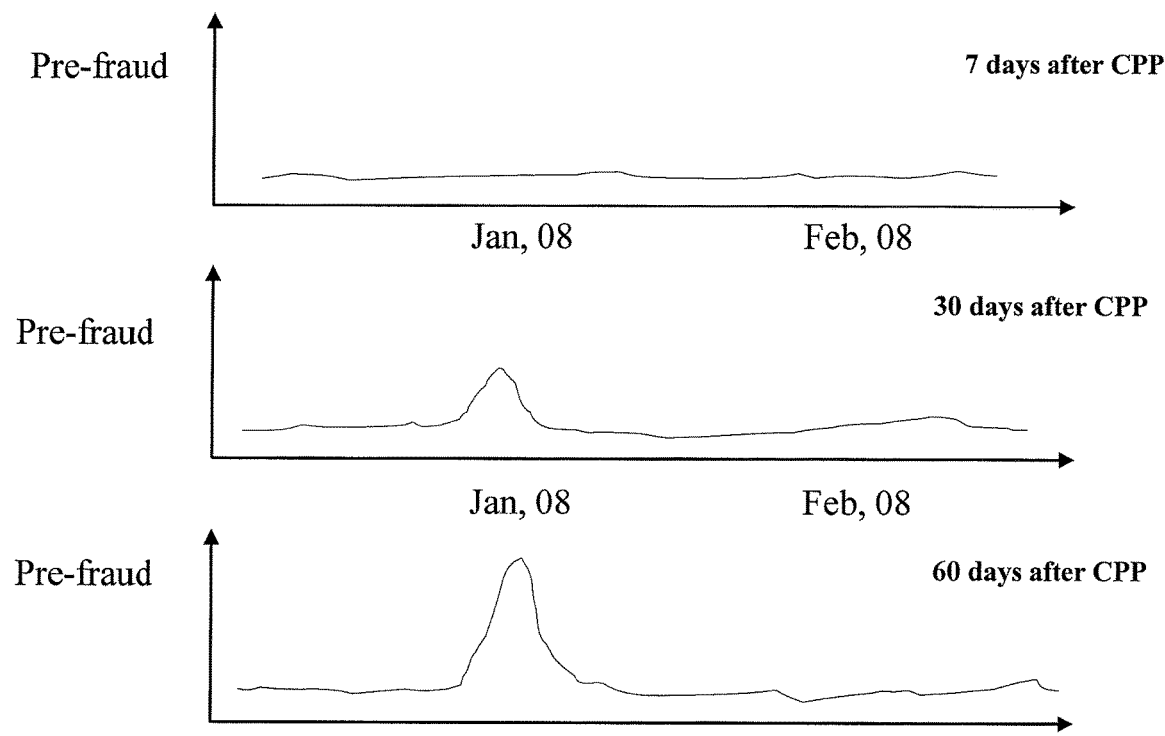
FIG. 2 illustrates an example of a common point of compromise pre-fraud patterns.
Figure 3:
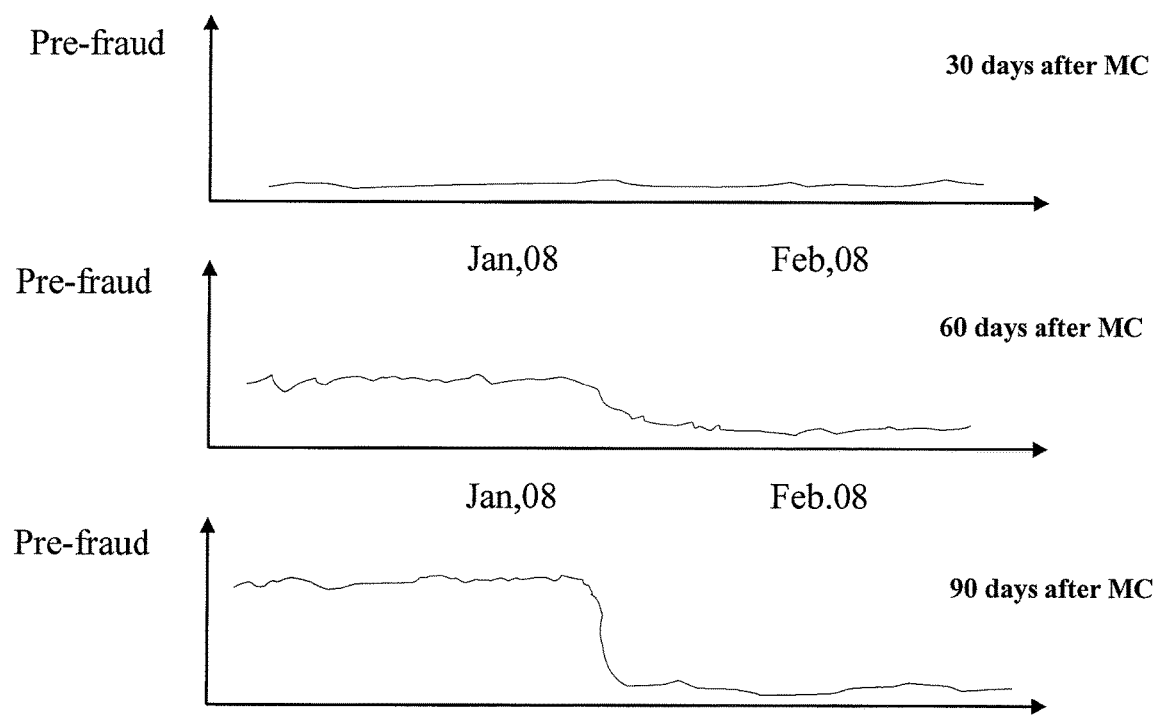
FIG. 3 illustrates an example of a mass compromise pre-fraud patterns.

FIG. 2 and FIG. 3 illustrate examples of common point of compromise and mass compromise pre-fraud patterns. FIG. 2 shows an example of development of the pre-fraud rate and the detection of a common Point of Compromise (POC) in an isolated time period. The pattern develops over time from seven days after POC, 30 days after POC, and 60 days after POC, based on subsequent fraud reporting as cards are used fraudulently. FIG. 3: shows an example of development of the pre-fraud rate and the detection of a Mass Compromise (MC) over an extended time period. The pattern develops over time from 30 days after MC, 60 days after MC, and 90 days after MC based on subsequent fraud reporting as accounts are used fraudulently.

Once the time period of compromise is identified, linked lists between the merchant device and the account histories in the card transaction profiles and the merchant device transaction profile are used to create an account membership associated with each compromise. A profile is created for the compromise, and all accounts that form the membership of the compromise are linked in a hierarchal fashion to the compromise profile 110. Variables in the compromise cluster track the global dynamics of the compromise population such as the suspected compromise accounts engaging in testing activities, correlations between accounts experiencing fraud, and "hotness" of the cluster.

Figure 4:
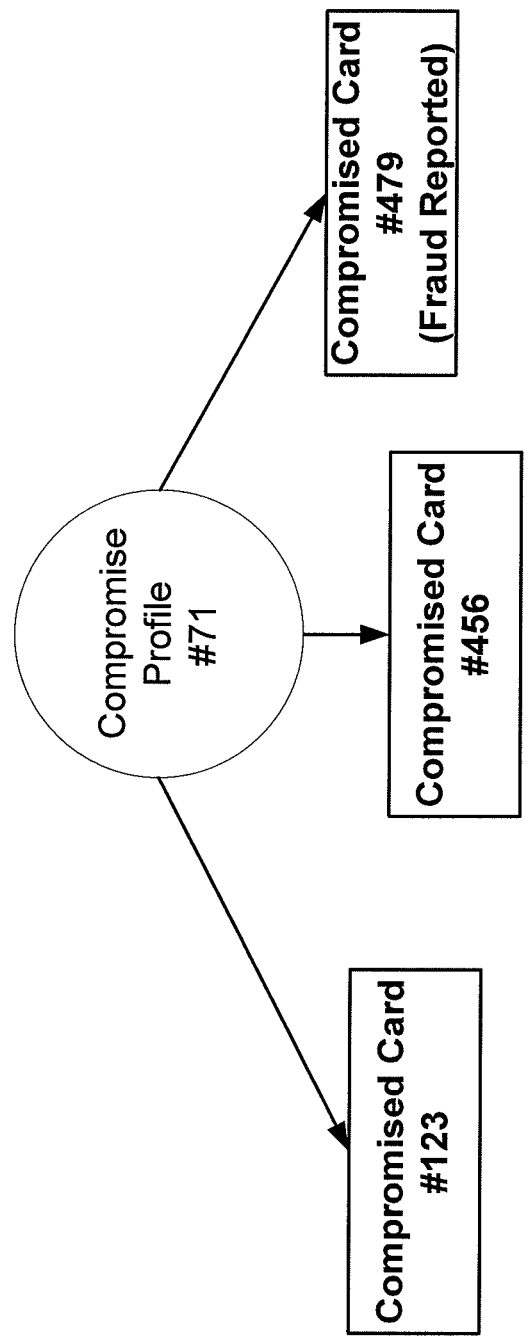
FIG. 4 illustrates a hierarchy of compromise cluster profile and linked compromised account profiles.

FIG. 4 illustrates a hierarchy of a compromise cluster profile and linked compromised account profiles. As schematically shown below in FIG. 4, a Compromise Analytics system computes a Compromise Account Score (CAS) based both on the activity of a compromised account and the dynamics of the associated compromise cluster. By producing a Compromise Account Score for each compromised account in the cluster, the Compromise Analytics system prioritizes accounts in the cluster to target for review, blocking, or account re-issue. This ranking is required, as not all accounts in the compromise cluster will go fraud, nor go fraud all at the same time. Account providers may utilize the compromise score to determine which accounts in the compromise cluster have the highest risk of future fraud.

With reference to FIG. 4, the following example illustrates the work flow in a Compromise Analytics system, starting at compromise detection:

Input

Account 123 transacts (A) at Merchant ABC on January 1

Action

Transaction A is used to update the account profile variables and account transaction profile Transaction A is used to update the receiver/website/merchant/processor/ATM-level variables and receiver/website/merchant/processor/ATM account history profile Input Account 479 is reported as a confirmed fraud on January 5

Action

The pre-fraud rate for all receiver/website/merchant/processor/ATMs visited by account 479 is recalculated receiver/website/merchant/processor/ATM X is determined to be a suspected compromise All accounts that transacted at receiver/website/merchant/processor/ATM X during the suspected compromise period are added to a compromise cluster #71. This includes accounts #123 and #456.

Input

Account 456 has a transaction B on January 6

Actions

Figure 5:
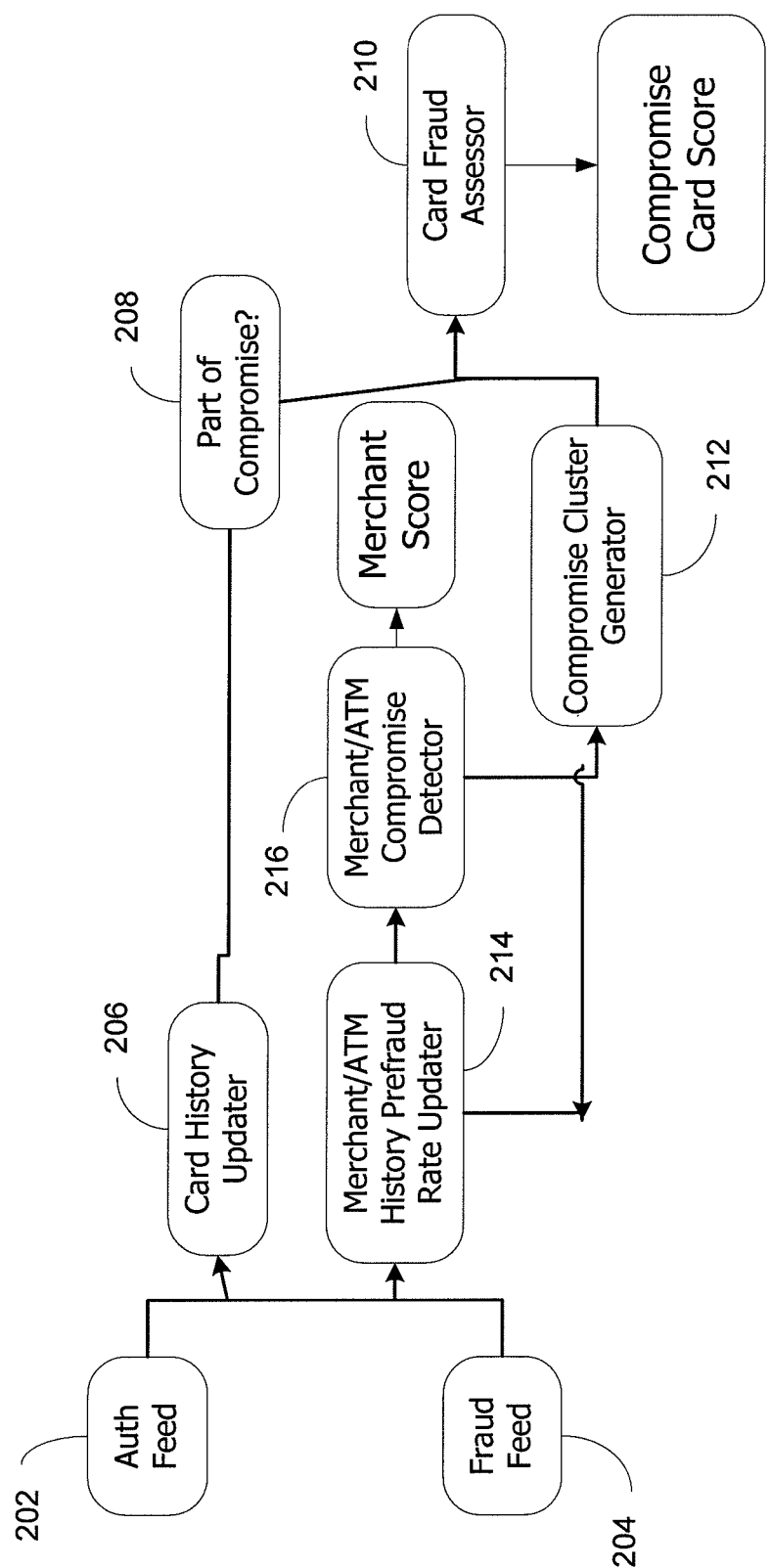
FIG. 5 is a schematic of a workflow of a compromise analytics system.

Transaction B is used to update the account profile variables and account transaction profile Transaction B is used to update the receiver/website/merchant/processor/ATM fraud variables and receiver/website/merchant/processor/ATM account history profile Transaction B is used to update the Compromise cluster #71 variables A Compromise Account Score (CAS) is produced for account #456 based on both account and cluster variables FIG. 5 schematically depicts a work flow 200 of a Compromise Analytics system that receives both authorization data 202 and fraud data 204, i.e. data of confirmed frauds. As an authorization is processed by account history updater 206, it is determined at 208 whether the corresponding account already belongs to a compromise cluster, and if so, a Compromise Account Score is generated based by account fraud assessor 210, based both on fraud detection variables in the account profile and a compromise cluster generated by compromise cluster generator 212, as is explained in further detail below. If the account is not part of a compromise cluster, the account variables are updated, the transaction is stored in the account history profile, the account activity is reflected in the merchant device profile and the links are updated by account history updater 206.

When a fraud is processed from fraud data 204, the account history profile for the fraudulent account is processed by merchant device history pre-fraud rate updater 214 to mark each merchant device that the account visited on a particular day with a pre-fraud. For example, this will indicate that one of the accounts that visited convenience store #281 back in Feb. 27, 2005 has gone fraud. Based on these pre-fraud updates, a pre-fraud pattern is computed for each merchant device by the merchant device compromise detector 216 as the account history for the fraudulent account is being processed by the merchant device updater 214. If the pre-fraud pattern is abnormal coupled with other predictive factors, a compromise cluster is generated by compromise cluster generator 212. Once a new compromise cluster is generated, accounts are linked to the compromise cluster, and the profile related to each account is updated with a Compromise Account Score (CAS) at the time the cluster is generated. As subsequent transactions occur for these compromised accounts, both the account profile variables and compromise cluster variables are updated, and the Compromise Account Score (CAS) is updated.

Compromise Associated with Information Capture or Network Breach

For a compromise associated with information capture or network breach, a different approach is utilized as there may not be any identifiable common attribute in the data stream to tie to the compromise. These accounts are suspected to be compromised if the account clusters are observed as being used abnormally in unison. This list of accounts is called the "suspected account list." The suspected account list is generated by looking at testing behavior associated at different merchant device, and comparing both to normal historical activity related to that merchant device and to similar merchant device.

Figure 6:
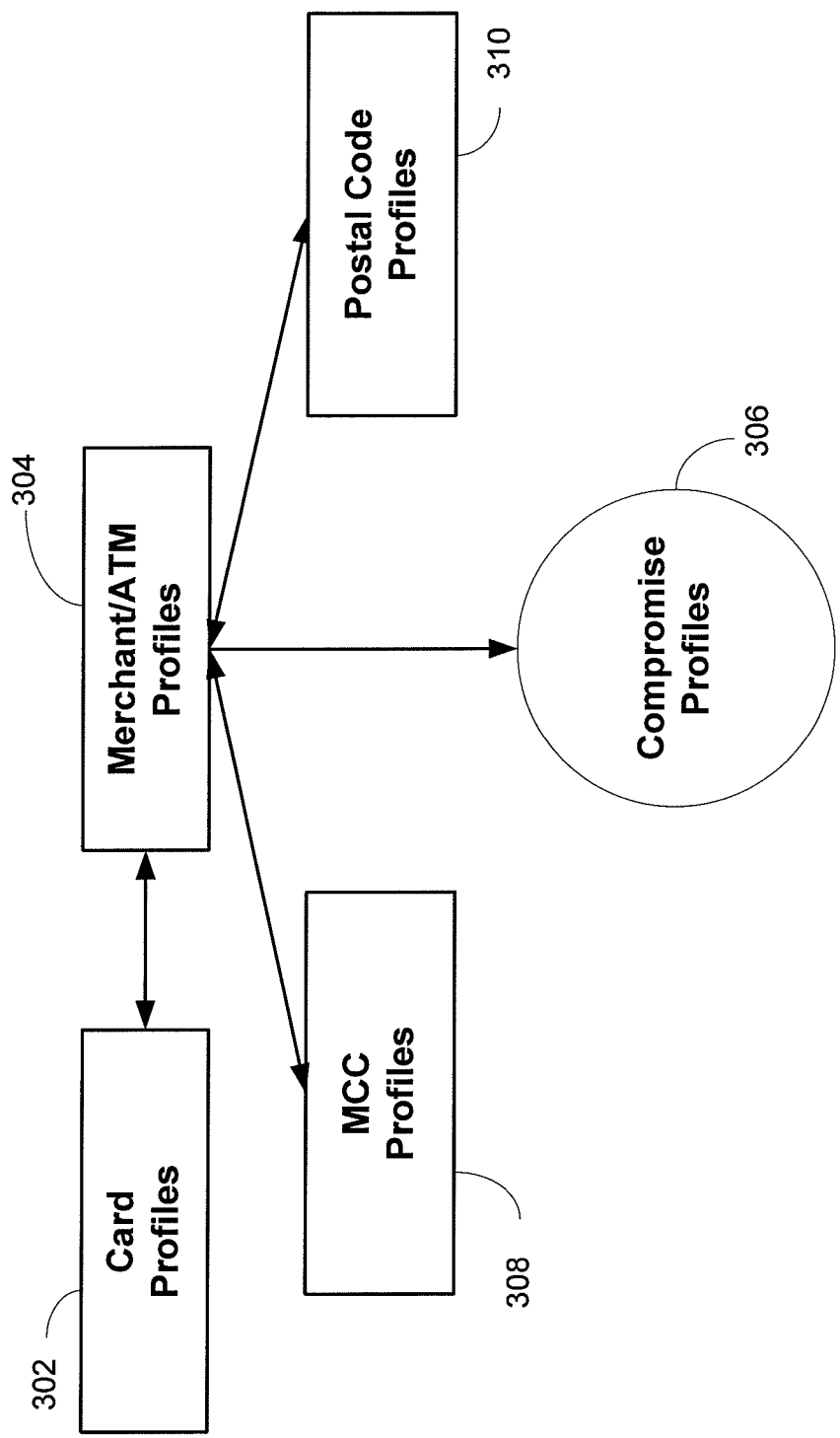
FIG. 6 illustrates a system and method for identifying a suspected account list based on network compromise.

FIG. 6 illustrates a system and method for identifying the suspected account list. In one implementation, abnormal account activities of groups of accounts associated with the merchant device is compared to historical patterns at the merchant device. For example, if on average between the hours of 3 AM and 4 AM there are typically 2.3 accounts transacting at an ATM, and on one particular night 15 accounts are observed transacting between 3 AM and 4 AM, then a compromise cluster is generated that consists of those 15 accounts. The suspected account list of these 15 accounts form the membership of the compromise cluster (note these are the accounts in 'play' and are not the entire set of compromised accounts). This compromise cluster and the linked 'suspect account list' is monitored to determine subsequent additional suspicious activity associated with the cluster or of those 15 accounts. If abnormal activity is again observed, the Compromise Analytics system raises the fraud risk for all accounts in the cluster. At a merchant, abnormal activities such as the average fraction of repeated authorization amounts, or fraction of declines per hour compared to the historical average may be monitored for generating compromise clusters of 'suspected accounts'.

As shown in FIG. 6, beyond a comparison of abnormal activity associated with account 302 at an individual merchant device to the historical behavior of card activity associated with that merchant device 304, the activities may be compared with those of similar merchant device. This can be accomplished by comparing the merchant activity to a Merchant Category Code (MCC) profile 308 for the merchant device, or to a Postal Code Profile 310 associated with the merchant device. This enables new merchant devices with little history to be compared to its peers to identify periods of abnormal account activity and to help prevent false positives (for example during Black Friday when one merchant may see much more activity this which would also be reflected by the MCC profile 308 that consists of multiple merchants). If a merchant device is showing abnormal activity compared to its peers either in a MCC profile 308 or Postal Code profile 310, then a sampling of accounts during the abnormal period can also be used to from a compromise cluster profile and to generate the associated suspect account list membership to link account profiles to the compromise profile.

Figure 7:
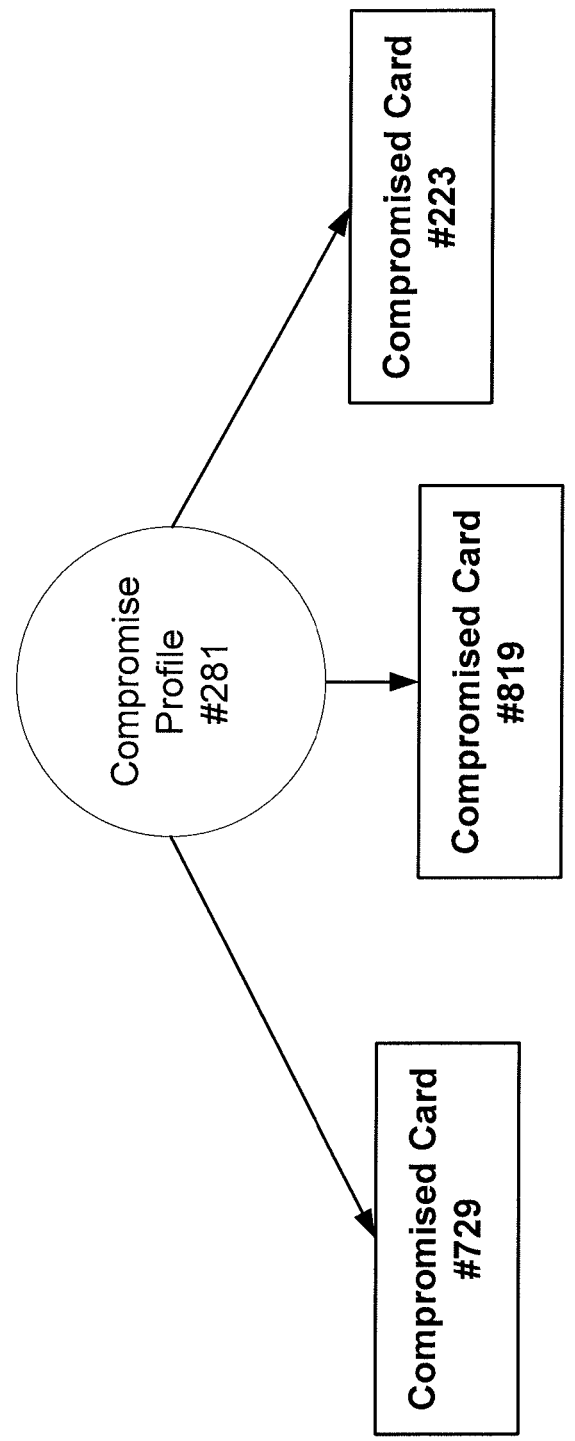
FIG. 7 shows a hierarchy of compromise cluster profile and linked suspect account profiles based on network compromise.

FIG. 7 shows a hierarchy of a compromise cluster profile and linked suspect account profiles. Once the compromise is detected, analytics are incorporated both at the compromise profile level and at the individual accounts as depicted in FIG. 7. These compromise clusters will typically have a different characteristic then that of common Points of Compromise (POC) or Mass Compromise (MC). This is due to the fact that the account membership, suspected account list, is already identified by the accounts' activity exhibiting abnormally risky behavior, but are not yet fully fraudulent. Another reason for the difference is that these compromise clusters are typically smaller in terms of the numbers of accounts associated with the compromise (usually a fraction of the total number of accounts compromised) and will likely be accounts that will very quickly be exploited to withdraw funds from the associated DDA accounts, or to run the credit utilization up to the credit limit. In other words, these compromise clusters will be "hot," and often the linked accounts will quickly become fraudulent. This requires very reactive analytics to take swift actions, as the operation of creating the compromise cluster in this fashion already has identified the accounts as showing abnormal activity. Managing the risk in these situations requires the ability to intercept the transactions in real time.

Figure 8:
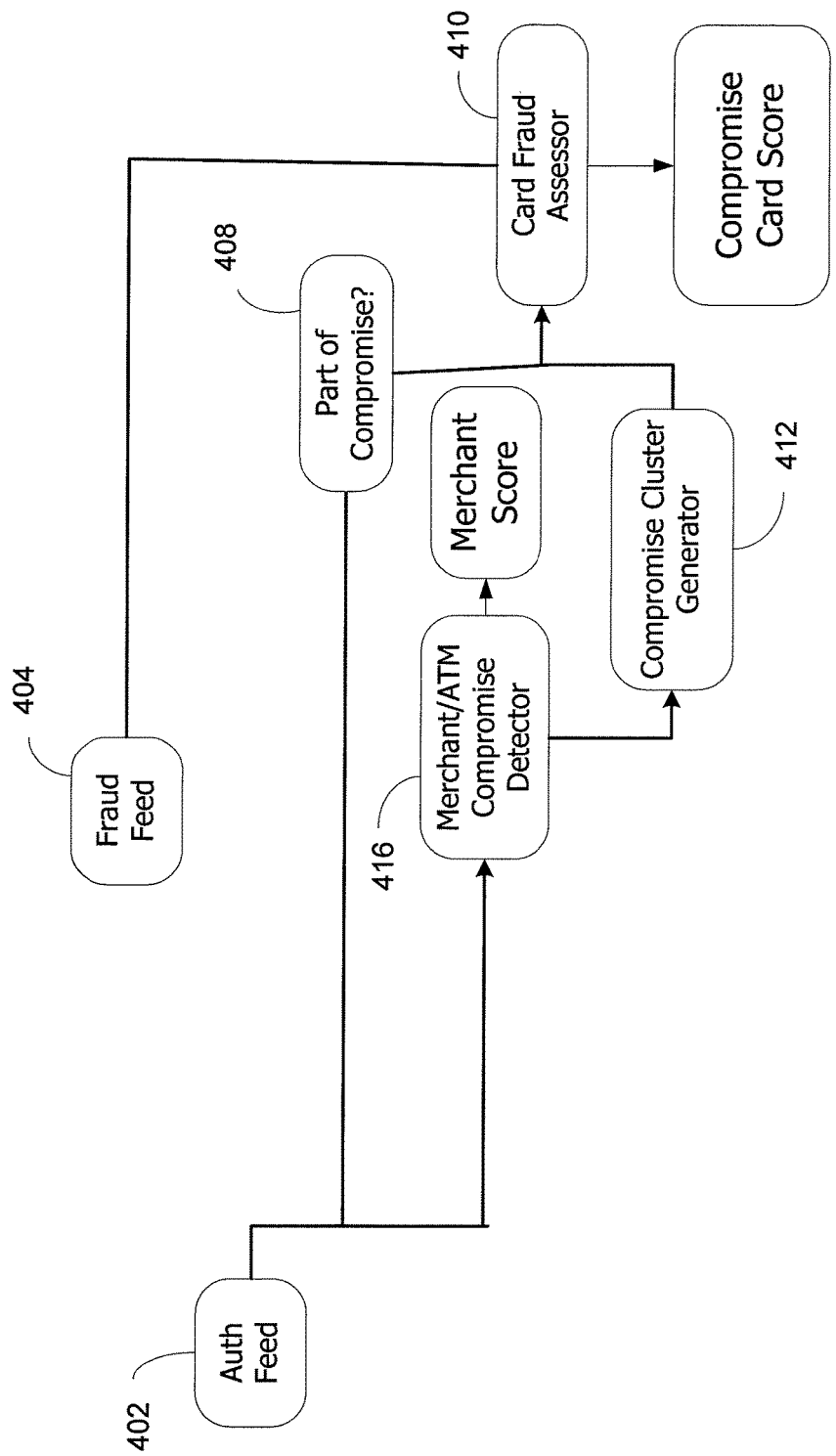
FIG. 8 illustrates profiles used in the compromise account score based on network compromise.

FIG. 8 schematically depicts the work flow of a Compromise Analytics system 400 when compromises are detected by utilizing patterns of abnormal account activity at the merchant device. The main difference from the workflow depicted in FIG. 5 is that the determination of the compromise is based on the testing behaviors of accounts at the merchant device, and does not rely on the account or merchant device transaction pre-fraud rates to determine compromises given that there are no commonalities in the data stream as to how the compromise has occurred. merchant device histories and linked lists between account transactions are used to link accounts that transact together in testing behaviors.

The Compromise Analytics system 400 receives both authorization data 402 and fraud data 404, i.e. data of confirmed frauds, and it is determined at 408 whether the corresponding account belongs to an existing compromise, and if so, a Compromise Account Score (CAS) is generated based by account fraud assessor 410, based both on fraud detection variables in the account profile and a compromise cluster profile generated by compromise cluster generator 412, as is explained in further detail below.

When an authorization is processed from the authorization data 402, aggregate account behavior patterns are computed for each merchant device by merchant device compromise detector 416. If the account behavior pattern variables are determined to be abnormal based on historical account behavior at the merchant device or based on peer analysis based on MCC/Postal Code profiles then coupled with other predictive factors, a compromise cluster is generated by compromise cluster generator 412. Once a new compromise cluster is generated, accounts are linked to the compromise, and the profile related to each account is updated with a Compromise Account Score (CAS) at the time the cluster is generated. As subsequent transactions occur for these compromised accounts, both the account profiles and compromise cluster variables are updated, and the Compromise Account Score (CAS) is updated.

Use of CAS

Figure 9:
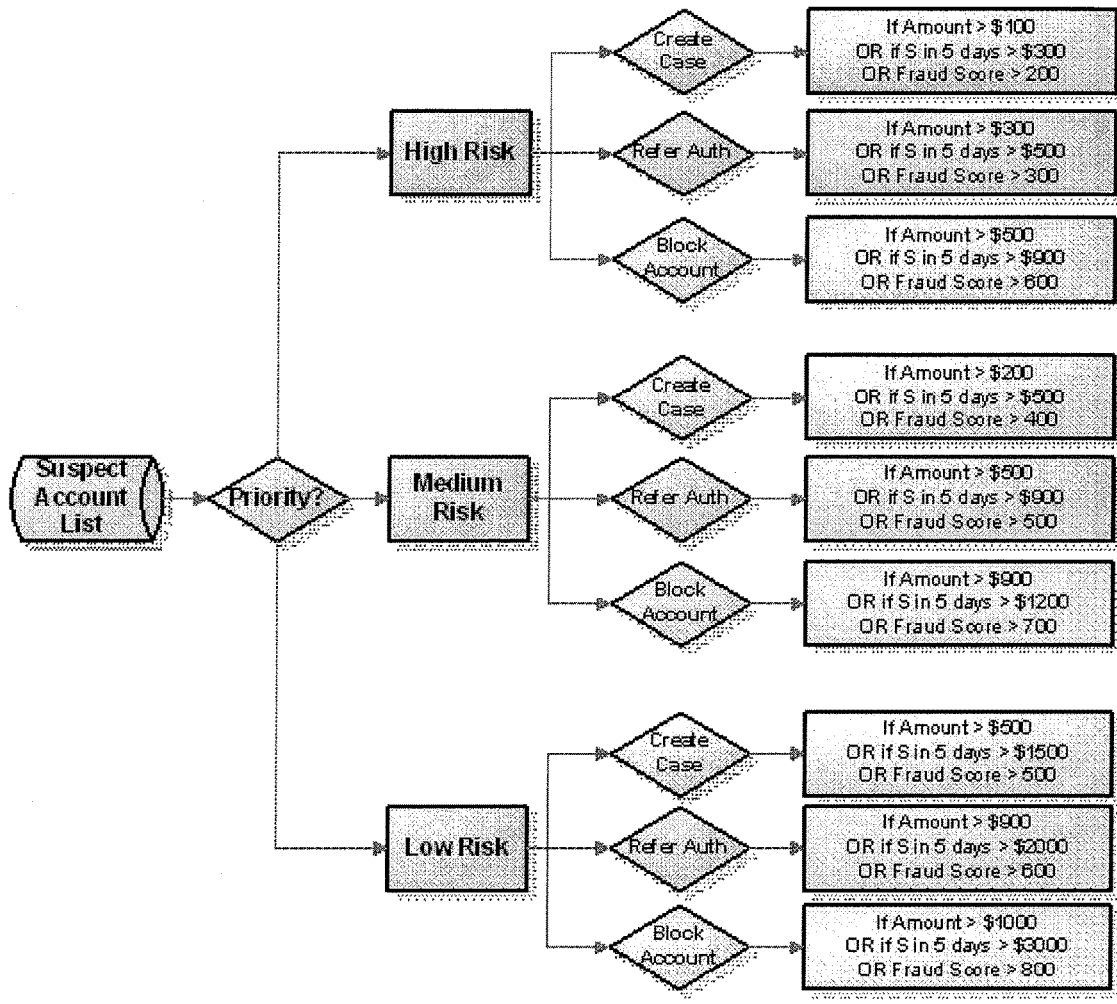
FIG. 9 shows Compromise Analytics used along with a traditional fraud score generator by managing the compromised account scores in low, medium, and high risk score categories with associated rule strategies.

Compromise Analytics will produce list of compromise accounts along with a account compromise score and reason codes. These account lists are then to be sent back to a fraud score generator to be used to supplement case generation logic. FIG. 9 demonstrates one use of Compromise Analytics along with an issuer's traditional use of a fraud score generator. Once a card is processed by the fraud score generator, a table lookup or user attribute will be used to determine whether the account is part of an identified compromise. If the account is not part of a compromise it will be processed according to standard practices. If the account is compromised, then based on the Compromise Account Score (provided in daily or weekly updates for common Points of Compromise (POC) and Mass Compromise (MC) and provided in real-time or hourly for 'suspected account lists') the account may be assigned to one of three categories. The three categories are low-risk, medium-risk, or high-risk in terms of the Compromise Account Score (CAS). Each of these categories may contain a higher density of accounts that will be fraudulent in the near future and therefore the fraud score thresholds can be set lower. In addition to changes to the fraud score threshold, other criteria can be combined to define case generation in each category so that an account provider's business constraints can be accommodated. For example VIP accounts can be excluded from referrals. Typically, an account provider would want to work the high and medium categories first and would ignore the low-category. The low-category would contain the least amount of fraud compared to the other categories.

A user may create more categories, or break out rule strategies differently for common Point of Compromise (POC), Mass Compromise (MC), and the suspect account lists-type of compromised accounts, as each type of compromise will have different fraud behaviors in terms of how quickly the accounts are utilized and what fraction of accounts are expected to go fraud. In other implementations the Compromise Account Score (CAS) can be integrated with a traditional card fraud score to produce a single card score for the account provider to use when working transaction fraud. Compromise membership lists and associated Point of Compromise or Mass Compromise events can also be reported such to notify the merchant device or network of a breach to make other account providers aware of the compromise. Exchange of compromises can allow other account providers to identify accounts in their own portfolios that might be compromised based on the time period associated with the detected suspect compromise. The third party account provider can then work cases differently based on the identification of the account being part of a compromise, or utilize a Compromise Analytics system to link the accounts to the compromise profile for active fraud management and re-assessment of the fraud risk of the compromised accounts.

Information and reporting on suspect account lists allows an associated account provider or other interested third party investigator to take the data on suspected account lists and, through subsequent analysis and/or interviews with account holders of suspected accounts, determine what activity caused their information to be compromised. For example, it may be determined that the only activity using the account was a check-in at an airport, and not necessarily a financial transaction. Or, it may be determined that the account was used to make a cash withdrawal at a convenience store ATM that reported an error, but did not give the account holder cash. Any number of different forensics studies can be performed with the data generated by the Compromise Analytics system described herein.

Some or all of the functional operations described in this specification can be implemented in digital electronic circuitry, or in computer software, firmware, or hardware, including the structures disclosed in this specification and their structural equivalents, or in combinations of them. Implementations can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate implementations, may also be provided in combination in a single implementation. Conversely, various features which, for brevity, are described in the context of a single implementation, may also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular implementations of the invention have been described. Other implementations are within the scope of the following claims. For example, the steps recited in the claims can be performed in a different order and still achieve desirable results. In addition, implementations of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A computer-implemented method for detecting compromise of financial transaction accounts, the method comprising:
   receiving authorization data for each of a number of financial transaction accounts that are authorized for use for a financial transaction executed by a merchant device;
   for each of the number of financial transaction accounts, in a memory associated with a computer:
      storing compromise cluster analytic variables representing a pre-fraud compromise of a group of the financial transaction accounts, the pre-fraud compromise comprising information related to at least a portion of the group of the financial transaction accounts being obtained by an unauthorized third party;
      generating an account profile that contains predictive fraud variables to be used in conjunction with the compromise cluster analytic variables to assign a compromise account score if any of the financial transaction accounts are identified as being part of the pre-fraud compromise;
      generating an account transaction profile that contains a purchase history of the account, the account transaction profile further containing one or more links between financial transaction accounts that are used at a particular merchant device each during a common time period;

generating a merchant device profile that contains predictive fraud variables relevant for compromise cluster generation; and generating a merchant device account transaction history profile that contains financial transaction account volume and velocity statistics at numerous time intervals, and tracking data that tracks the number of accounts that experience fraud at a later date;

receiving, by the computer, reported fraud data that represents a confirmed fraudulent use of one or more of the number of financial transaction accounts;

identifying, by the computer and in response to the receiving the reported fraud data, merchant devices associated with the confirmed fraudulent use;

calculating, by the computer and for each merchant device of the identified merchant devices, a pre-fraud pattern;

generating, by the computer and based on the pre-fraud pattern, a compromise cluster, the compromise cluster identifying suspicious financial transaction accounts, the generating the compromise cluster comprising:

generating, for each suspicious financial transaction account, a compromise account score based on fraud detection variables of an associated account profile of the suspicious financial transaction account; and ranking, by the computer, each of the suspicious financial transaction accounts based on the compromise account scores;

generating, by the computer, a compromise profile for the identified suspicious financial transaction accounts based on a comparison of the reported fraud data with the account profile, account transaction profile, merchant device profile, and merchant device account history profile; and denying, by the computer at authorization, a transaction associated with a first suspicious financial transaction account of the identified suspicious financial transaction accounts.

2. The computer-implemented method in accordance with claim 1, further comprising updating the account transaction profile with new authorization data.

3. The computer-implemented method in accordance with claim 2, further comprising updating the merchant device account history profile with new authorization and fraud data.

4. The computer-implemented method in accordance with claim 1, further comprising generating a reason code for each identified suspicious financial transaction account, the reason code identifying a reason for suspicion of compromise.

5. The computer-implemented method in accordance with claim 1, further comprising generating a merchant score for the merchant device associated with use of a financial transaction account related to a confirmed fraud, and based on the account profile, account transaction profile, merchant device profile, and merchant device account history profile.

6. The computer-implemented method in accordance with claim 5, further comprising transmitting the compromise account scores for the identified suspicious financial transaction accounts and the merchant device score to a user over a communications network.

7. The computer-implemented method in accordance with claim 1, further comprising:

assigning, by the computer and based on the compromise risk score, a second suspicious financial transaction account of the identified suspicious financial transaction accounts to a risk category; and comparing, by the computer, the compromise risk score of the second suspicious financial transaction account to a threshold associated with the risk category.

* * * * *